United States Patent [19]
Arai et al.

[11] Patent Number: 5,255,317
[45] Date of Patent: Oct. 19, 1993

[54] SUBSCRIBER LINE INTERFACE CIRCUIT FOR SERVING ISDN SUBSCRIBERS USING ECHO CANCELLERS AND POTS SUBSCRIBERS

[75] Inventors: Masanobu Arai; Yoshihide Hiraoka, both of Tokyo, Japan

[73] Assignee: NEC Corporation, Tokyo, Japan

[21] Appl. No.: 847,732

[22] Filed: Mar. 9, 1992

[30] Foreign Application Priority Data

Mar. 8, 1991 [JP] Japan ................................ 3-43142

[51] Int. Cl.$^5$ .............................................. H04M 1/00
[52] U.S. Cl. .................................... 379/399; 379/402
[58] Field of Search ............... 379/399, 402, 403, 404; 370/110.1, 94.1, 94.2, 60, 60.1

[56] References Cited

U.S. PATENT DOCUMENTS

4,707,825  11/1987  Amstutz et al. ........................ 370/60

OTHER PUBLICATIONS

Akata, et al., "A No-Trimming SLIC Two-Chip Set With Coin Telephone Signaling Facilities", *IEEE Journal of Solid-State Circuits*, vol. 25, No. 2, Apr. 1990, pp. 458-464.

Arai, et al., "Design Techniques and Performance of an LSI-Based 2B1Q Transceiver", *IEEE Global Telecommunications Conference*, Nov. 28-Dec. 1, 1988, pp. 778-782.

*Primary Examiner*—James L. Dwyer
*Assistant Examiner*—Creighton Smith
*Attorney, Agent, or Firm*—Foley & Lardner

[57] ABSTRACT

A subscriber line interface circuit includes a switched hybrid circuit operable during a POTS mode when the associated subscriber is using a POTS station and in an ISDN mode when the subscriber is using an ISDN station. The hybrid circuit includes a first amplifier circuit for coupling a signal at the two-wire port thereof to its four-wire transmit port, and a second amplifier circuit for coupling a signal at the four-wire receive port of the hybrid to the two-wire port. A high termination impedance is synthesized at the two-wire port during the POTS mode and a low termination impedance at the two-wire port during the ISDN mode. The signal from the four-wire transmit port is converted to a digital signal and applied to a digital signal processor which is configured differently according to DSP running programs respectively stored in first and second memories for operations during the POTS and ISDN modes. The DSP processes signals received from the hybrid's four-wire transmit port as well as from the telephone switching system according to the program supplied from the first or second memory and applies the process signals to the switching system and the four-wire receive port.

8 Claims, 3 Drawing Sheets

ISDN MODE

POTS MODE

SUBSCRIBER LINE INTERFACE CIRCUIT FOR SERVING ISDN SUBSCRIBERS USING ECHO CANCELLERS AND POTS SUBSCRIBERS

BACKGROUND OF THE INVENTION

The present invention relates generally to subscriber line interface circuits for digital telephone switching systems, and more specifically to a subscriber line interface circuit for a switching system serving both ISDN (Integrated Services Digital Network) and POTS (Plain Old Telephone Service) subscribers.

Subscriber line interface circuits are of two types, one for serving subscribers using POTS stations. The other type of SLIC serves subscribers using ISDN stations which employ the echo cancellation scheme to exploit the full bandwidth of the two-wire transmission channel, instead of the time division duplex scheme, or 'ping-pong' transmission where the bandwidth is divided between the opposite ends of the transmission channel. The functional separation of the types of subscriber line interface circuit is due to the remarkable differences between the frequency range of the signals for POTS and ISDN lines and their termination impedances. Specifically, the SLIC of the POTS type handles signals in the range of frequencies from 0.3 to 3.4 kHz with a termination impedance varying in the range from 600 to 900 ohms, whereas the ISDN type SLIC handles 2B1Q (two bits one quarternary) line-coded signals in the range from several tens of kHz to more than 100 kHz with a termination impedance as low as 100 ohms. Digital signal processors have also been developed for use with different types of subscriber line interface circuit.

However, needs arise to replace a subscriber line interface circuit designed for POTS stations with one designed for ISDN stations when the subscriber so desires and such needs will increase as ISDN network expands.

SUMMARY OF THE INVENTION

It is therefore an object of the present invention to provide a subscriber line interface circuit which can be used both for POTS and ISDN users by combining the features of the conventional subscriber line interface circuits.

According to the present invention, there is provided a subscriber line interface circuit for a digital telephone switching system serving both ISDN (Integrated Services Digital Network) subscriber stations having an echo canceller and POTS (Plain Old Telephone Service) subscriber stations. The SLIC comprises a switched hybrid circuit operable during a POTS mode when an associated subscriber is using a POTS subscriber station and an ISDN mode when the associated subscriber is using an ISDN subscriber station, the switched hybrid circuit having a two-wire port coupled to the line loop of the associated subscriber, a four-wire receive port and a four-wire transmit port. The hybrid circuit includes a first amplifier circuit for coupling a signal at the two-wire port to the four-wire transmit port, and a second amplifier circuit for coupling a signal at the four-wire receive port to the two-wire port. A high termination impedance is synthesized at the two-wire port during the POTS mode and a low termination impedance at the two-wire port during the ISDN mode. An A/D converter is coupled to the four-wire transmit port of the hybrid circuit for converting analog signals therefrom to digital signals and a D/A converter is coupled to the switching system for converting digital signals therefrom into analog signals and applying same to the four-wire receive port of the hybrid circuit. A digital signal processor is provided for receiving digital signals from the A/D converter and pulse code modulation signals from the switching system, processing the received signals according to a program supplied thereto and applying a processed version of the signals from the A/D converter to the switching system and a processed version of the signals from the switching system to the D/A converter. A first memory stores a first program for configuring the digital signal processor to effect balancing network computation and codec filter computation during the POTS mode and a second memory stores a second program for configuring the digital signal processor to effect echo canceller computation and equalization decision computation during the ISDN mode. Means are provided for causing the switched hybrid circuit and the first and second memories to be switched from the POTS mode to the ISDN mode.

The hybrid circuit comprises a resistance element coupled to the two-wire port and a network balancing impedance element arranged to be coupled to the resistance element during the ISDN mode. A first, second and third differential amplifier circuits are provided. The first differential amplifier circuit amplifies a signal from the two-wire port with a unity gain and applies the amplified signal to the four-wire transmit port during the POTS mode, and differentially combines a signal from the two-wire port with a signal at the network balancing impedance element and applies the combined signal to the four-wire transmit port during the ISDN mode. The second differential amplifier circuit differentially combines signals from the first differential amplifier circuit and the four-wire receive port according to a predetermined voltage dividing ratio during the POTS mode, and for amplifies a signal from the four-wire receive port with a unity gain during the ISDN mode. The third differential amplifier circuit for differentially combines a signal from the second differential amplifier circuit and a signal from the two-wire port and applies the combined signal to the resistance element during the POTS mode, and amplifies a signal from the second differential amplifier circuit with a unity gain, and applies it to the resistance and impedance elements during the ISDN mode.

BRIEF DESCRIPTION OF THE DRAWINGS

The present invention will be described in further detail with reference to the accompanying drawings, in which.

DETAILED DESCRIPTION

Figure 1:
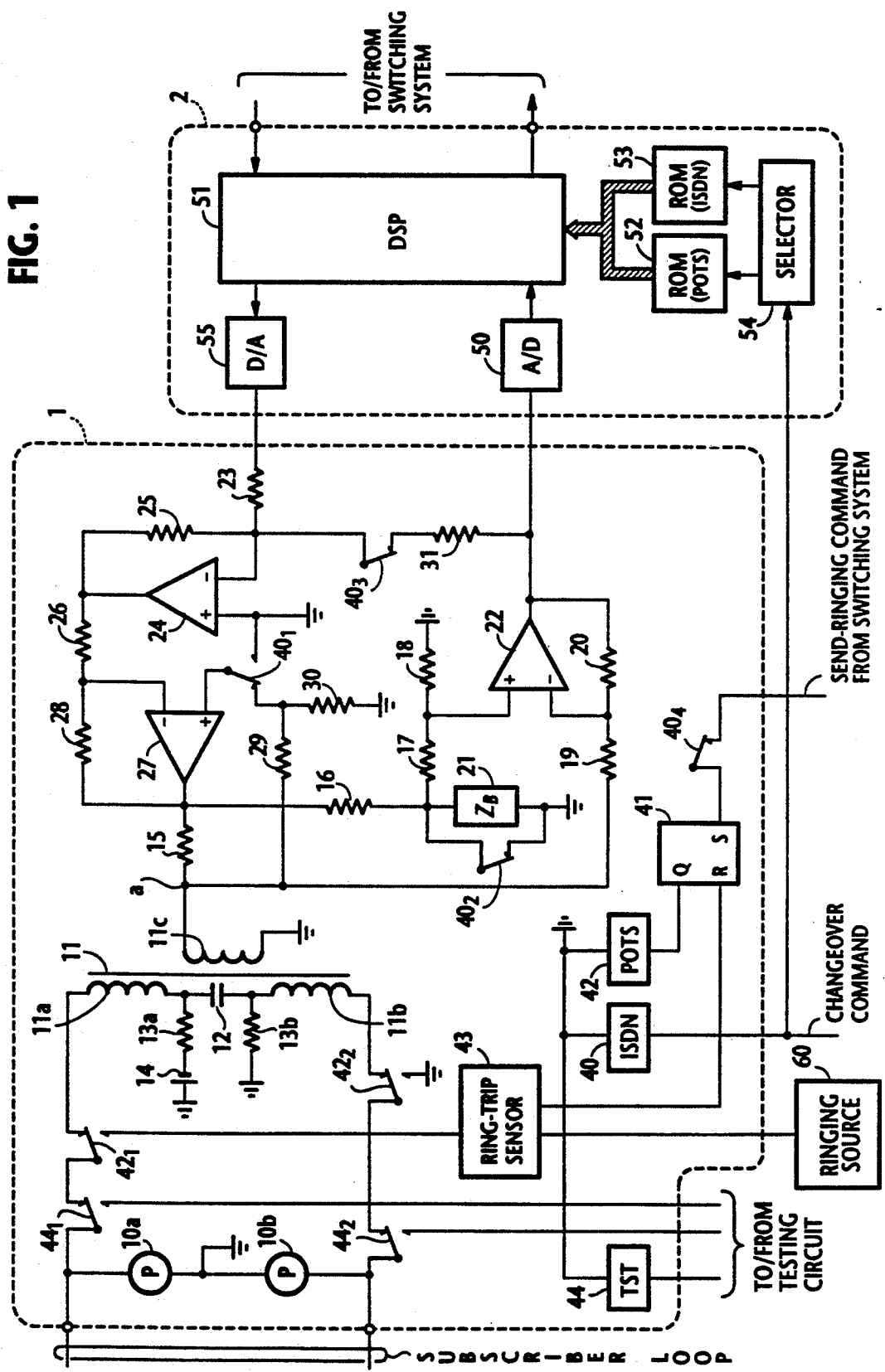
FIG. 1 is a circuit diagram of a subscriber line interface circuit according to the present invention.

Referring now to FIG. 1, there is shown a subscriber line interface circuit of a digital telephone switching system according to the present invention. The line interface circuit of the invention generally comprises an analog circuit 1 interfacing to an associated subscriber loop and a digital circuit 2 interfacing to the switching system.

The analog circuit 1 includes a pair of grounded protection devices 10a, 10b coupled across the subscriber loop for protecting the circuit from overvoltages developed across the lines. The subscriber loop is terminated at the near end by a line transformer 11. The far end of the subscriber loop may be terminated by an echo canceller, not shown, when the subscriber's telephone is of the ISDN type to permit two-way transmission of digital signals, or terminated by a POTS type telephone for two-way transmission of analog signals. The line-side of the transformer has two split windings 11a and 11b, which are coupled together by a dc-decoupling capacitor 12. The opposite ends of the dc-decoupling capacitor 12 are grounded through current limiting resistors 13a and 13b, respectively. A battery 14 is connected to resistor 13a to provide a dc current through the loop to the subscriber.

An ISDN relay 40 is provided for responding to a changeover-to-ISDN command signal from an external source by shifting its moving contacts of contact assemblies $40_1$, $40_2$, $40_3$ and $40_4$. In a practical aspect, the relay 40 and its contact assemblies are implemented by semiconductor switches. In response to an incoming call, a send-ringing command signal is supplied from the switching system to the set input of a flip-flop 41 through normally closed contacts $40_4$ of relay 40 to operate a POTS relay 42 whose contact assemblies $42_1$ and $42_2$ are connected in the path between the subscriber loop and transformer 11. As will be described, relay 42 is operated if the SLIC is operated to serve a POTS subscriber to supply ringing current from an external ringing source 60 through a ring-trip sensor 43 to the subscriber station. When the called party answers, ring-trip sensor 43 is operated to restore the relay 42 by resetting flip-flop 41. A TST relay 44 is provided to respond to a test command signal from an external testing circuit to directly connect it to the subscriber lines by operating its contact assemblies $44_1$ and $44_2$.

On the system-side, transformer 11 has a winding 11c which is coupled to a switched hybrid circuit formed by operational amplifiers 22, 24 and 27, resistors 15–20, 23, 25, 26, 28, 29~31 and a network balancing element 21 having an impedance value $Z_B$. One end of winding 11c is coupled through resistors 15, 16, 17 and 18 to ground, with a circuit junction "a" between winding 11c and resistor 15 being connected through resistors 19 and 20 to the output of operational amplifier 22. A circuit junction between resistors 16 and 17 is connected by balancing impedance element 21 to ground. Impedance element 21 is short-circuited by contact assembly $40_2$ when the SLIC is in the POTS mode. Operational amplifier 22 has its noninverting input coupled to a junction between resistors 17 and 18, the inverting input of the amplifier 22 being coupled to a junction between resistors 19 and 20. The output of operational amplifier 22 supplies subscriber's transmit signals in analog form to the digital circuit 2. After being processed by digital circuit 2 in a manner as will be described, the subscriber's transmit signals are converted to a PCM signal and transmitted to the switching system.

Incoming 8-kHz sampled PCM signals from the switching system are converted by digital circuit 2 to an analog voice-band signal when the SLIC is in the POTS mode or converted to a 2B1Q line-coded signal when it is in the ISDN mode and supplied to analog circuit 1 through resistor 23 to the inverting input of an operational amplifier 24, and thence to its output through resistor 25. The output of operational amplifier 24 is coupled through resistor 26 to the inverting input of operational amplifier 27, and thence to its output through resistor 28. The noninverting input of operational amplifier 24 is grounded, while the noninverting input of operational amplifier 27 is connected through the normally closed contacts of contact assembly $40_1$ to a junction between resistors 29 and 30 which are series connected between circuit junction "a" and ground when the SLIC is in the POTS mode. Otherwise, the noninverting input of operational amplifier 27 is coupled by the normally open contacts of contact assembly $40_1$ to ground. The output of operational amplifier 22 is connected through resistor 31 and the normally closed contact assembly $40_3$ to a junction between resistors 23 and 25 to which the inverting input of operational amplifier 24 is connected. The effect of resistor 31 is to establish a feedback loop through the switched hybrid circuit by coupling the output of operational amplifier 22 to operational amplifier 24 during the POTS mode.

Digital circuit 2 includes an analog-to-digital converter 50 for providing analog-to-digital conversion and output signals from operational amplifier 22. The output of A/D converter 50 is supplied to a digital signal processor 51 of known design such the ones available under the product serial number µPD-7720. Read-only memories 52 and 53 are provided for respectively storing programs for operating digital signal processor 51. The program stored in ROM 52 is to be used when the SLIC is operated in POTS mode by configuring the DSP to provide balancing network computations, codec filter computations and PCM encoding and decoding functions, while the program stored in ROM 53 is to be used when the SLIC is operated in the ISDN mode by reconfiguring the DSP to operate essentially as an echo canceller and an equalization decision circuit. A selector 54 is provided to respond to the changeover-to-ISDN command signal by switching the DSP configuration from the POTS to the ISDN mode by enabling ROM 53 and disabling ROM 52.

Figure 2A:
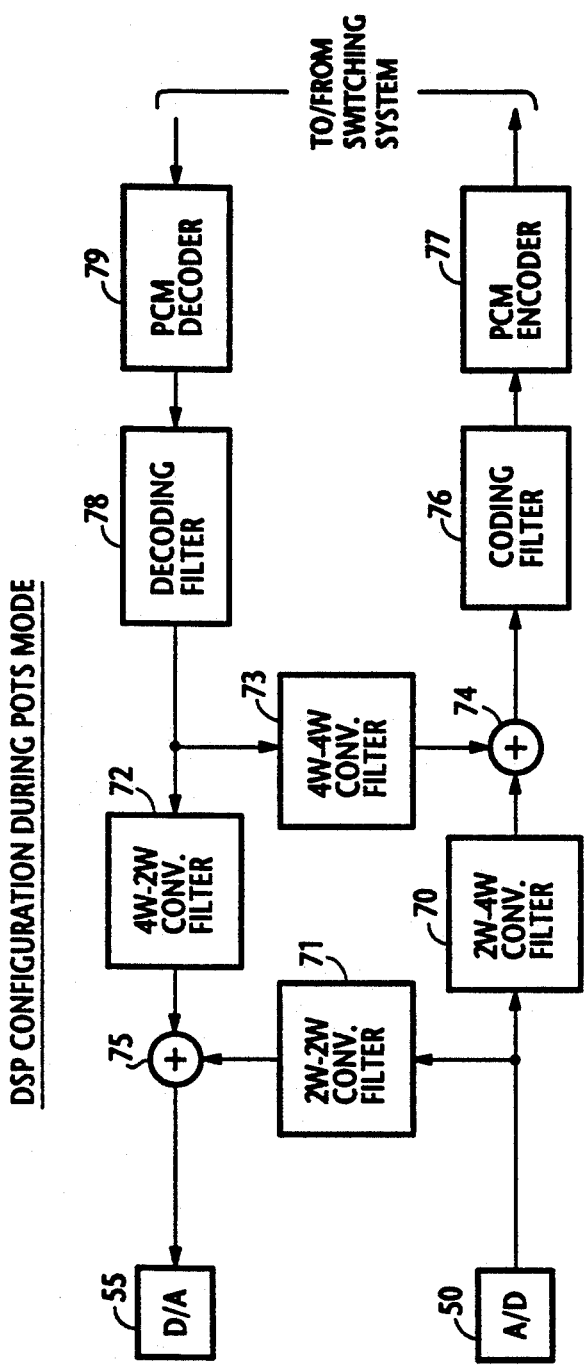
FIG. 2A and 2B are views illustrating different configurations of the digital signal processor of FIG. 1 during POTS and ISDN modes, respectively.

During the POTS mode, digital signal processor 51 is configured as shown in FIG. 2A to provide balancing network computations with two-wire to four-wire conversion filter 70, four-wire to two-wire conversion filter 72, two-wire to two-wire conversion filter 71 and four-wire to four-wire conversion filter 74. Conversion filter 70 provides 2w-to-4w conversion computations on the output of A/D converter 50 and conversion filter 73 provides 4w-to-4w conversion computation on the output of a decoding filter 78. The outputs of filters 70 and 73 are summed in an adder 74 and supplied to a coding filter 76. Conversion filter 72 provides 4w-to-2w conversion computations on the output of decoding filter 78 and conversion filter 71 provides 2w-to2w conversion on the output of A/D converter 50, the outputs of filters 71 and 72 being summed in an adder 75 and applied to a D/A converter 55 in which it is converted to an analog signal. Since DSP 51 operates at 16 kHz sampling rate twice the rate of the PCM signal, coding filter 76 provides data decimation for reducing the sampling rate and computations for voice-band passing computations on the output of adder 74 and supplies its output to a PCM encoder 77 whose function is to convert the linear PCM signal to a companded PCM signal, the output of PCM encoder 77 being coupled to the switching system. A PCM signal from the switching system is applied to a PCM decoder 79 to convert the companded PCM signal from the switching system to a linear PCM signal, which is applied to decoding filter 78. Decoding filter 78 provides interpolation on the output of PCM decoder 79 to accommodate the difference between the PCM and DSP sampling rates and supplies its output to conversion filters 72 and 73.

Note that design details of the program stored in ROM 52 are described in a paper under the title "A No-trimming SLIC Two-Chip Set with Coin Telephone Signaling Facilities", Masao Akata et al, IEEE Journal of Solid-State Circuits, Vol. 25, No. 2, April 1990. ROM 52 is implemented by NEC Corporation as an LSI under the product serial number μPD-3879 CU-001.

Figure 2B:
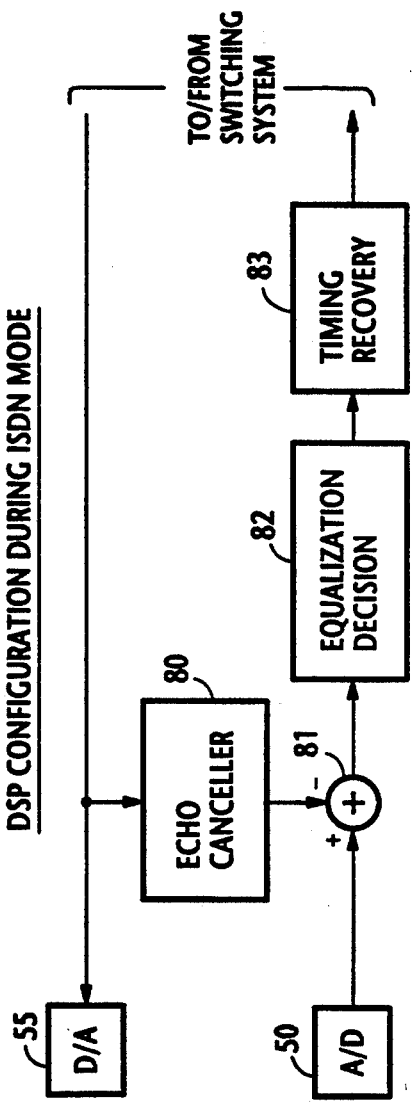

During the ISDN mode, digital signal processor 51 is configured to provide an echo canceller 80, an adder 81, an equalization decision circuit 82 and a timing recovery circuit 83 as shown in FIG. 2B. It is seen that the incoming signal from the switching system is applied to echo canceller 80 as well as to D/A converter 55 in which it is oversampled to produce a 2B1Q line-coded signal. This echo canceller provides its output to adder 81 in which it is subtracted from the output of A/D converter 50. The output of adder 81 is coupled to equalization decision circuitry 82, timing recovery circuit 83 extracts clock information from the equalization circuit for coupling to the switching system together with subscriber's outgoing signal. Design details of the program stored in ROM 53 are described in a paper titled "Design Techniques and Performance of an LSI-Based 2B1Q Transceiver", M. Arai et al, IEEE Global Telecommunications Conference, Nov. 28–Dec. 1, 1988. ROM 53 is implemented by NEC Corporation as an LSI under the product serial number μPD-80033. The ISDN subscriber station is provided with a digital signal processor and a read-only memory similar to DSP 51 and ROM 53, respectively, of the SLIC to convert the 2B1Q signal to analog signal.

Figure 3B:
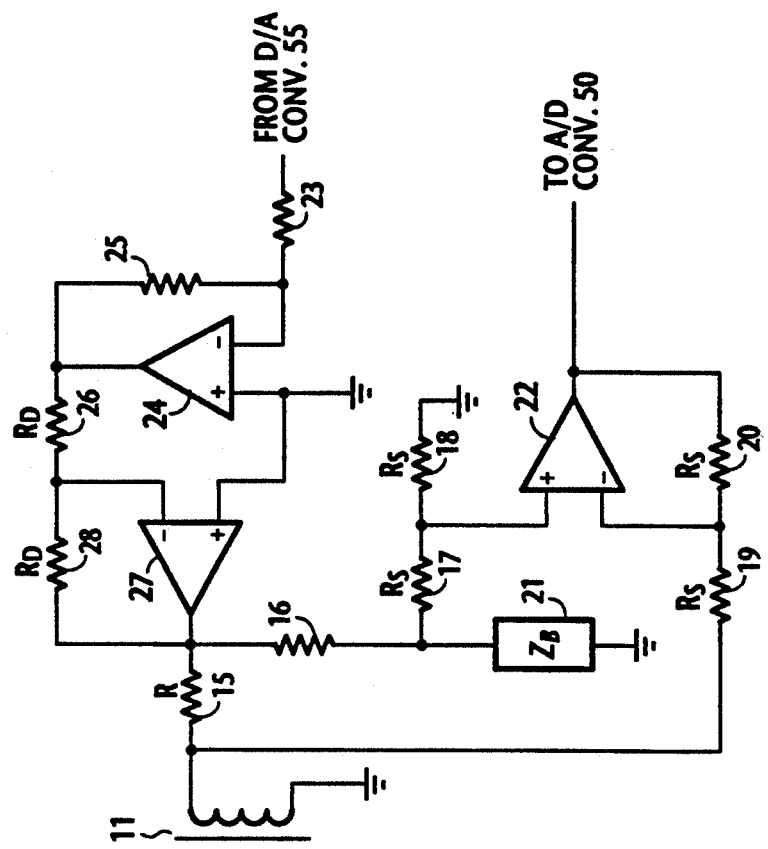
FIGS. 3A and 3B are views illustrating equivalent circuits of the switched hybrid circuit of FIG. 1 during the POTS and ISDN modes, respectively.
Figure 3A:
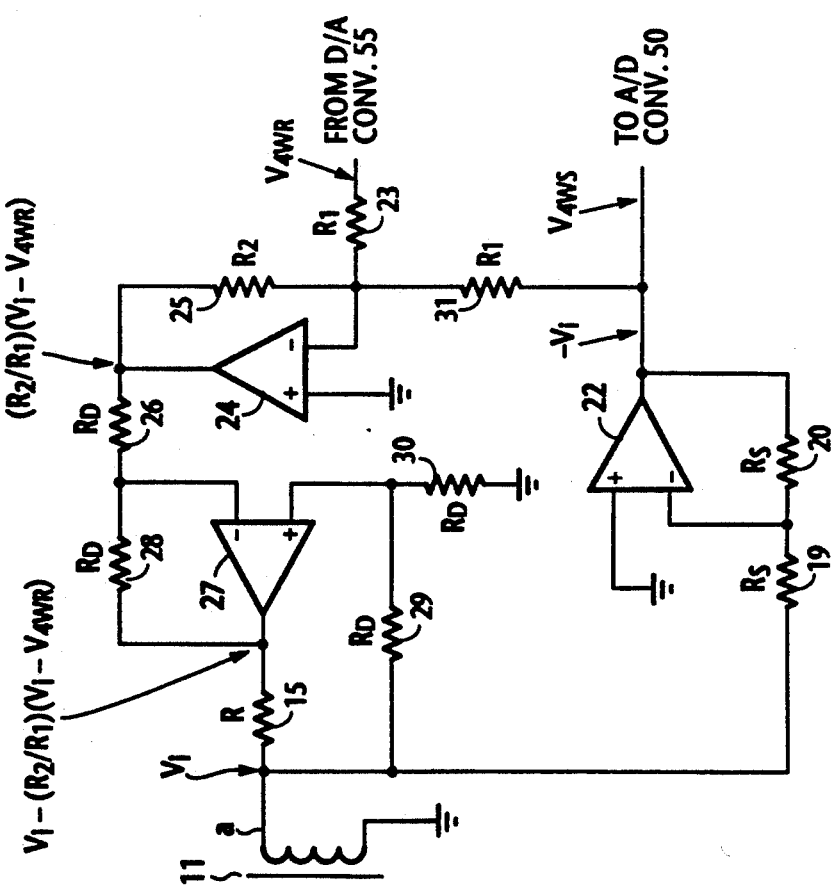

FIGS. 3A and 3B show in detail the different functions of the switched hybrid circuit of analog circuit 1 according to the POTS and ISDN modes of the subscriber line interface circuit. The resistors have the following resistance values respectively:

Resistor 15=R
Resistors 17, 18, 19, 20=$R_S$
Resistors 26, 28, 29, 30=$R_D$
Resistor 23, 31=$R_1$
Resistor 25=$R_2$ During the POTS mode, the network balancing impedance 21 is switched out of circuit because of the lower frequency range of the voice-band analog signal than the frequency range of the 2BQ1 signal of the ISDN mode and the higher load impedance of the POTS subscriber loop than that of the ISDN subscriber loop, and instead, the digital signal processor 51 provides this network balancing function for the hybrid circuit to match it with the load impedance of the subscriber loop. As shown in FIG. 3A, the switched hybrid circuit is configured during the POTS mode, in which $V_i$ is used to represent the voltage at circuit junction "a". Operational amplifier 22 therefore develops an output voltage $-V_i$ and operational amplifier 24 produces a voltage which is given by:

$$\frac{R_2}{R_1}(V_i - V_{4WR}) \quad (1)$$

where, $V_{4WR}$ represents the voltage supplied from D/A converter 55 as a signal to be transmitted to the two-wire subscriber loop from the four-wire circuit. Since the voltage at the noninverting input of operational amplifier 27 is one half the voltage $V_i$, this amplifier produces an output voltage given by Equation (2):

$$V_i - \frac{R_2}{R_1}(V_i - V_{4WR}) \quad (2)$$

circuit. As a result, current $I_i$ given by Equation (3) flows through resistor R.

$$I_i = \frac{1}{R} \times \frac{R_2}{R_1}(V_i - V_{4WR}) \quad (3)$$

From Equation (3), it is seen that if $V_{4WR}$ is zero, resistor 15 has the following equivalent impedance Z:

$$Z = \frac{V_i}{I_i} = \frac{R_1}{R_2} \times R \quad (4)$$

If resistor 15 is terminated by the following load impedance $R_L$ as looking into the subscriber loop:

$$R_L = \frac{R_1}{R_2} \times R \quad (5)$$

Equation (5) given below is established since voltage $V_i$ is obtained by the ratio of impedance $R_L$ to the sum of resistance R and impedance $R_L$.

$$\frac{\frac{R_1}{R_2} \times R}{R + \frac{R_1}{R_2} \times R} = \frac{V_i}{V_i - \frac{R_2}{R_1}(V_i - V_{4WR})} \quad (6)$$

By rearranging Equation (6), the following relation holds:

$$V_i = \frac{V_{4WR}}{2} \quad (7)$$

Therefore, the energy entering at the four-wire receive port of the switched hybrid circuit is divided equally into signals, one being delivered to the subscriber loop and the other being fed back to DSP 51 in which it is converted by 2w-4w conversion filter 70 and cancelled with the output of 4w-4w conversion filter 73 by adder 74. On the other hand, most of the energy entering at the two-wire port of the hybrid circuit is delivered to the four-wire receive port of the hybrid circuit and only an insignificant proportion of the energy is applied to the amplifier 24 because of the large impedance value synthesized by resistor 15.

During the ISDN mode, the switched hybrid circuit is configured as shown in FIG. 3B in which the input of amplifier 24 is isolated from the output of amplifier 22. Due to the absence of the feedback loop of FIG. 3A, resistor R acts as a termination impedance. Balancing impedance element 21 ($=Z_B$) is switched into circuit to be balanced with the subscriber load impedance and prevent the voltage at the output of D/A converter 55 from finding a path to the input of A/D converter 50.

It is seen from the above, that during the POTS mode the SLIC has a large termination impedance which is synthesized by resistor 15 by multiplying its intrinsic value R by a factor $R_1/R_2$, and when the SLIC is changed over to the ISDN mode the termination impedance switches to its intrinsic value R. By appropriately determining the ratio $R_1/R_2$ and resistance R, the subscriber line interface circuit of this invention can be adapted for use with both POTS and ISDN users.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A subscriber line interface circuit for a digital telephone switching system serving both ISDN (Integrated Services Digital Network) subscriber stations having an echo canceller and POTS (Plain Old Telephone Service) subscriber stations, comprising:
    a switched hybrid circuit operable during a POTS mode when an associated subscriber is using a POTS subscriber station and an ISDN mode when said associated subscriber is using an ISDN subscriber station, said switched hybrid circuit having a two-wire port coupled to a loop of the associated subscriber, a four-wire receive port and a four-wire transmit port, first amplifier means for coupling a signal at said two-wire port to said four-wire transmit port, second amplifier means for coupling a signal at said four-wire receive port to said two-wire port, and means for synthesizing a high termination impedance at said two-wire port during said POTS mode and a low termination impedance at said two-wire port during said ISDN mode;
    an analog-to-digital (A/D) converter coupled to said four-wire transmit port of the hybrid circuit for converting analog signals therefrom to digital signals;
    a digital-to-analog (D/A) converter coupled to said switching system for converting digital signals therefrom into analog signals and applying same to said four-wire receive port of the hybrid circuit;
    a digital signal processor for receiving digital signals from said A/D converter and pulse code modulation signals from said switching system, processing the received signals according to a program supplied thereto and applying a processed version of the signals from the A/D converter to said switching system and a processed version of the signals from the switching system to said D/A converter;
    first memory means for storing a first program for configuring said digital signal processor to effect balancing network computation and codec filter computation during said POTS mode;
    second memory means for storing a second program for configuring said digital signal processor to effect echo canceller computation and equalization decision computation during said ISDN mode; and
    means for causing said switched hybrid circuit and said first and second memory means to be switched from the POTS mode to the ISDN mode.

2. A subscriber line interface circuit as claimed in claim 1, wherein the switched hybrid circuit comprises:
    a resistance element coupled to said two-wire port as a low termination impedance during said ISDN mode; and
    means for synthesizing an impedance at said two-wire port as said termination impedance using said resistance element as part of the impedance during said POTS mode so that the synthesized impedance is higher than the resistance of said resistance element.

3. A subscriber line interface circuit as claimed in claim 1, wherein switched hybrid circuit is responsive to a changeover command signal supplied thereto for switching said hybrid circuit from the POTS mode to the ISDN mode so that said high termination impedance is switched to said low termination impedance, and wherein said first memory means is disabled in response to said command signal and said second memory means is enabled in response to said command signal.

4. A subscriber line interface circuit as claimed in claim 1, wherein said switched hybrid circuit includes a network balancing impedance and means for coupling said network balancing impedance to said second amplifier means during said ISDN mode.

5. A subscriber line interface circuit as claimed in claim 1, further comprising a ringing circuit for applying a ringing signal to said loop when an incoming call is terminated to said switching system until a ring-trip condition occurs in the loop during said POTS mode, and means for disabling said ringing circuit during said ISDN mode.

6. A subscriber line interface circuit for a digital telephone switching system serving both ISDN (Integrated Services Digital Network) subscriber stations having an echo canceller and POTS (Plain Old Telephone Service) subscriber stations, comprising:
    a switched hybrid circuit operable during a POTS mode when an associated subscriber is using a POTS subscriber station and an ISDN mode when said associated subscriber is using an ISDN subscriber station, said switched hybrid circuit having a two-wire port coupled to a loop of said associated subscriber, a four-wire transmit port and a four-wire receive port, said hybrid circuit comprising:
    a resistance element coupled to said two-wire port;
    a network balancing impedance element arranged to be coupled to said resistance element during said ISDN mode;
    a first differential amplifier circuit for amplifying a signal from said two-wire port with a unity gain and applying the amplified signal to said four-wire transmit port during said POTS mode, and for differentially combining a signal from said two-wire port with a signal at said network balancing impedance element and applying the combined signal to said four-wire transmit port during said ISDN mode;
    a second differential amplifier circuit for differentially combining signals from said first differential amplifier circuit and said four-wire receive port according to a predetermined voltage dividing ratio during said POTS mode, and for amplifying a signal from said four-wire receive port with a unity gain during said ISDN mode;
    a third differential amplifier circuit for differentially combining a signal from said second differential amplifier circuit and a signal from said two-wire port and applying the combined signal to said resistance element during said POTS mode and for amplifying a signal from said second differential amplifier circuit with a unity gain, and for applying the amplified signal to said resistance and impedance elements during said ISDN mode;

an analog-to-digital (A/D) converter for converting analog signals from the four-wire transmit port of said hybrid circuit to digital signals;

a digital-to-analog (D/A) converter for converting digital signals applied thereto to analog signals and applying same to said four-wire receive port of the hybrid circuit;

first memory means for storing a first program for effecting network balancing computations and codec filter computations during said POTS mode;

second memory means for storing a second program for effecting echo canceller computations and equalization decision computations during said ISDN mode;

a digital signal processor configurable according to each of said first and second programs, the processor receiving digital signals from said A/D converter and pulse code modulation signals from said switching system, processing the received signals according to the program supplied from one of said memory means and applying a processed version of the signals from the A/D converter to said switching system and a processed version of the signals from the switching system to said D/A converter; and means for causing said switched hybrid circuit and said first and second memory means to be switched from the POTS mode to the ISDN mode.

7. A subscriber line interface circuit as claimed in claim 6, wherein energy of a signal from said four-wire receive port is substantially equally divided into a portion delivered to said two-wire port and a portion delivered to said four-wire transmit port during said POTS mode.

8. A subscriber line interface circuit as claimed in claim 6, further comprising a ringing circuit for applying a ringing signal to said loop when an incoming call is terminated to said switching system until a ring-trip condition occurs in the loop during said POTS mode, and means for disabling said ringing circuit during said ISDN mode.

* * * * *